(12) United States Patent
Kondo

(10) Patent No.: US 11,900,564 B2
(45) Date of Patent: Feb. 13, 2024

(54) STORAGE MEDIUM STORING PROGRAM, IMAGE PROCESSING APPARATUS, AND TRAINING METHOD OF MACHINE LEARNING MODEL

(71) Applicant: BROTHER KOGYO KABUSHIKI KAISHA, Nagoya (JP)

(72) Inventor: Masaki Kondo, Toyoake (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 186 days.

(21) Appl. No.: 17/321,651

(22) Filed: May 17, 2021

(65) Prior Publication Data
US 2021/0374916 A1 Dec. 2, 2021

(30) Foreign Application Priority Data
May 27, 2020 (JP) ................................. 2020-092072

(51) Int. Cl.
G06K 9/00 (2022.01)
G06T 5/00 (2006.01)
(Continued)

(52) U.S. Cl.
CPC ............ G06T 5/001 (2013.01); G06F 18/214 (2023.01); G06N 20/00 (2019.01); G06T 5/002 (2013.01);
(Continued)

(58) Field of Classification Search
CPC ......... G06T 5/001; G06T 5/002; G06T 5/003; G06T 5/50; G06T 2207/20081;
(Continued)

(56) References Cited

U.S. PATENT DOCUMENTS

| | | | | |
|---|---|---|---|---|
| 6,463,167 B1* | 10/2002 | Feldman | ................... | G06T 7/12 |
| | | | | 382/128 |
| 8,818,109 B2* | 8/2014 | Kisilev | ................. | G06V 10/30 |
| | | | | 382/172 |
| 2020/0311490 A1* | 10/2020 | Lee | ........................... | G01T 1/17 |

FOREIGN PATENT DOCUMENTS

JP 2009-25862 A 2/2009

OTHER PUBLICATIONS

V. Sharma, A. Diba, D. Neven, M. S. Brown, L. V. Gool and R. Stiefelhagen, "Classification-Driven Dynamic Image Enhancement," 2018 IEEE/CVF Conference on Computer Vision and Pattern Recognition, Salt Lake City, UT, USA, 2018, pp. 4033-4041 (Year: 2018).*

* cited by examiner

*Primary Examiner* — Alex Kok S Liew
(74) *Attorney, Agent, or Firm* — Scully, Scott, Murphy & Presser, PC

(57) ABSTRACT

A non-transitory computer-readable storage medium storing a set of program instructions for an image processing apparatus is disclosed. The set of program instructions, when executed by a controller of the image processing apparatus, causes the image processing apparatus to: acquire input image data indicating an input image; and input the input image data to a trained machine learning model configured to perform calculation processing on the input image data and to generate output image data corresponding to the input image data. The machine learning model is trained to generate the output image data indicating a first area and a second area. The first area is an area in the input image in which it is preferable to perform first image processing. The second area is an area in the input image in which it is preferable to perform second image processing different from the first image processing.

20 Claims, 10 Drawing Sheets

(51) Int. Cl.
*G06N 20/00* (2019.01)
*G06T 5/50* (2006.01)
*G06V 10/44* (2022.01)
*G06F 18/214* (2023.01)
*G06V 10/774* (2022.01)
*G06V 10/776* (2022.01)
*G06V 10/82* (2022.01)

(52) U.S. Cl.
CPC ................ *G06T 5/003* (2013.01); *G06T 5/50* (2013.01); *G06V 10/44* (2022.01); *G06V 10/774* (2022.01); *G06V 10/776* (2022.01); *G06V 10/82* (2022.01)

(58) Field of Classification Search
CPC ...... G06F 18/214; G06N 20/00; G06N 3/045; G06N 3/048; G06N 3/084; G06V 10/44; G06V 10/774; G06V 10/776; G06V 10/82
See application file for complete search history.

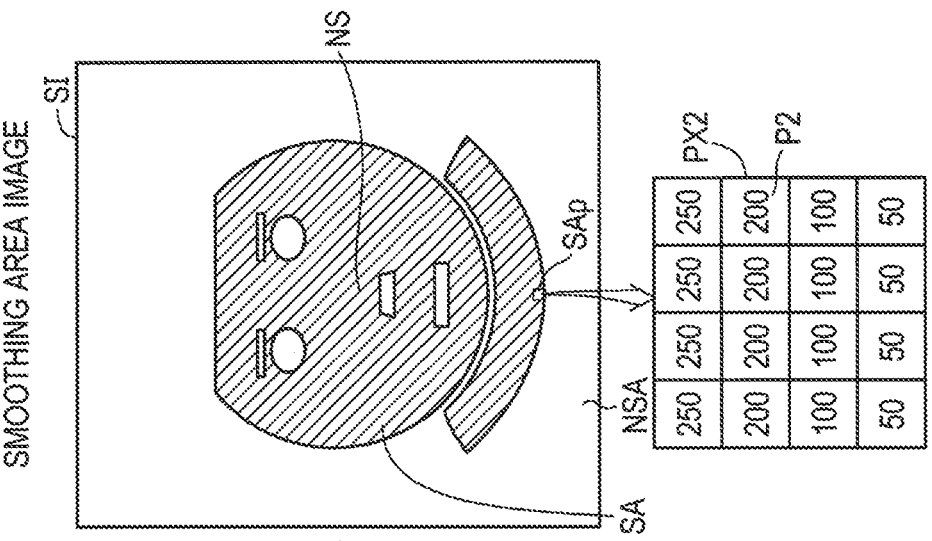
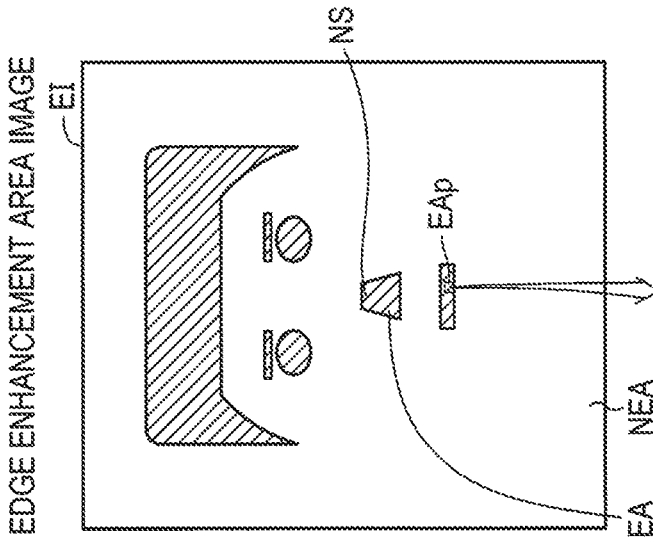
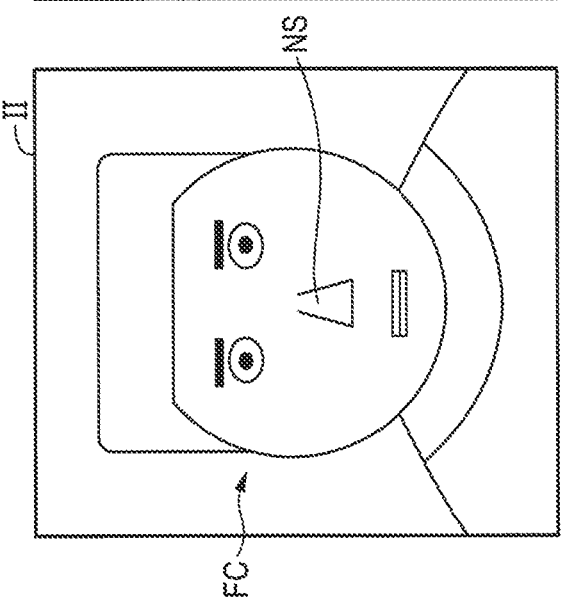

FIG. 10A
BEFORE ADJUSTMENT

EDGE ENHANCEMENT AREA IMAGE EI

| 250 | 250 | 250 | 250 | PX1 |
|-----|-----|-----|-----|-----|
| 200 | 200 | 200 | 200 | P1 |
| 100 | 100 | 100 | 100 | |
| 50 | 50 | 50 | 50 | |

SMOOTHING AREA IMAGE SI

| 200 | 200 | 200 | 200 | PX2 |
|-----|-----|-----|-----|-----|
| 200 | 200 | 200 | 200 | P2 |
| 200 | 200 | 200 | 200 | |
| 200 | 200 | 200 | 200 | |

FIG. 10B
AFTER ADJUSTMENT

EDGE ENHANCEMENT AREA IMAGE EIb

| 50 | 50 | 50 | 50 | PX1 |
|----|----|----|----|-----|
| 0 | 0 | 0 | 0 | P1 |
| 0 | 0 | 0 | 0 | |
| 0 | 0 | 0 | 0 | |

SMOOTHING AREA IMAGE SIb

| 0 | 0 | 0 | 0 | PX2 |
|---|---|---|---|-----|
| 0 | 0 | 0 | 0 | P2 |
| 100 | 100 | 100 | 100 | |
| 150 | 150 | 150 | 150 | |

STORAGE MEDIUM STORING PROGRAM, IMAGE PROCESSING APPARATUS, AND TRAINING METHOD OF MACHINE LEARNING MODEL

CROSS REFERENCE TO RELATED APPLICATIONS

This application claims priority from Japanese Patent Application No. 2020-092072 filed May 27, 2020. The entire content of the priority application is incorporated herein by reference.

TECHNICAL FIELD

This disclosure relates to identifying areas where it is preferable to perform image processing.

BACKGROUND

A known image processing apparatus detects the edge amount of each pixel in an image, and executes a sharpening process for each pixel, which has different parameters depending on the magnitude of the edge amount. Thus, different sharpening processes are executed for pixels in an edge portion and pixels in a non-edge portion in the image.

SUMMARY

According to one aspect, this specification discloses a non-transitory computer-readable storage medium storing a set of program instructions for an image processing apparatus. The set of program instructions, when executed by a controller of the image processing apparatus, causes the image processing apparatus to: acquire input image data indicating an input image; and input the input image data to a trained machine learning model configured to perform calculation processing on the input image data and to generate output image data corresponding to the input image data. The machine learning model is trained to generate the output image data indicating a first area and a second area. The first area is an area in the input image in which it is preferable to perform first image processing. The second area is an area in the input image in which it is preferable to perform second image processing different from the first image processing.

According to another aspect, this specification also discloses an image processing apparatus. The image processing apparatus includes a controller and a memory storing instructions. The instructions, when executed by the controller, cause the image processing apparatus to: acquire input image data indicating an input image; input the input image data to a trained machine learning model configured to perform calculation processing on the input image data and to generate output image data corresponding to the input image data, the machine learning model being trained to generate the output image data indicating a first area and a second area, the first area being an area in the input image in which it is preferable to perform first image processing, the second area being an area in the input image in which it is preferable to perform second image processing different from the first image processing; perform the first image processing on first data out of the input image data, the first data indicating the first area identified by the output image data; and perform the second image processing on second data out of the input image data, the second data indicating the second area identified by the output image data.

According to still another aspect, this specification also discloses a training method of a machine learning model. The machine learning model is configured to perform calculation processing on input image data indicating an input image and to generate output image data corresponding to the input image data. The method includes: acquiring a plurality of training input image data; acquiring a plurality of teacher image data corresponding to the plurality of training input image data, each of the plurality of teacher image data being image data indicating a first area and a second area in a corresponding input image, the corresponding input image being indicated by a corresponding one of the plurality of training input image data, the first area being an area in which it is preferable to perform first image processing, the second area being an area in which it is preferable to perform second image processing different from the first image processing; and adjusting a plurality of parameters of the machine learning model by using a plurality of sets of data pairs each including the training input image data and the teacher image data corresponding to the training input image data.

The techniques disclosed in this specification can be realized in various forms, for example, a training method of a machine learning model, an image generation method, an apparatus and a computer program for realizing these methods, and a storage medium storing the computer program.

BRIEF DESCRIPTION OF THE DRAWINGS

Embodiments in accordance with this disclosure will be described in detail with reference to the following figures wherein:

FIGS. 3A to 3C are diagrams showing an example of an input image and an output image;

FIGS. 10A and 10B are explanatory diagrams of the area adjustment process according to the second embodiment.

DETAILED DESCRIPTION

Figure 1:
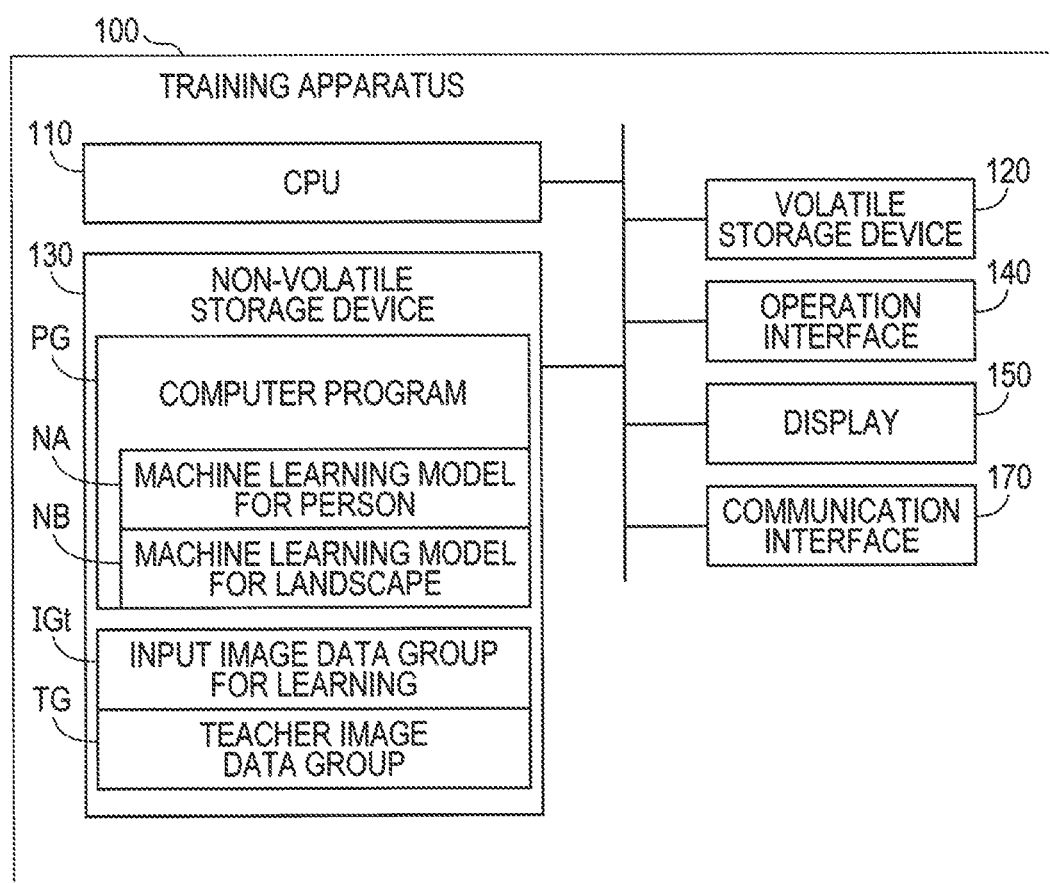
FIG. 1 is a block diagram showing the configuration of a training apparatus 100.

In the above-described technique, parameters are merely changed depending on the amount of edges. There are cases where it is not possible to appropriately identify an area in which it is preferable to perform image processing such as the sharpening process in the image. For this reason, for example, it may not be possible to perform image processing on an appropriate area in the image.

In view of the foregoing, an aspect of an objective of this specification is to disclose a technique for appropriately identifying areas where it is preferable to perform image processing.

A. Embodiment

A-1. Configuration of Training Apparatus

An embodiment will be described while referring to the drawings.

As shown in FIG. 1, a training apparatus 100 is a computer such as a personal computer. The training apparatus 100 includes a CPU 110 as a controller of the training apparatus 100, a volatile storage device 120 such as RAM, a non-volatile storage device 130 such as a hard disk drive and a flash memory, an operation interface 140, a display 150, and a communication interface (IF) 170. The operation interface 140 is a device that receives a user's operation, such as a keyboard and a mouse. The display 150 is a device for displaying an image, and is, for example, a liquid crystal display. The communication interface 170 is an interface for connecting with an external device.

The volatile storage device 120 provides a buffer area for temporarily storing various intermediate data generated when the CPU 110 performs processing. The non-volatile storage device 130 stores a computer program PG, an input image data group for learning IGt, and a teacher image data group TG. The input image data group for learning IGt includes a plurality of input image data ID (described later) used for a training process described later.

The computer program PG is provided, for example, by the manufacturer of a printer described later, and is installed in the training apparatus 100. The computer program PG may be provided in a form downloaded from a particular server or stored in a CD-ROM, a DVD-ROM, and so on. By executing the computer program PG, the CPU 110 executes the training process of a machine learning model for person NA and a machine learning model for landscape NB which will be described later.

The computer program PG includes, as a module, a computer program that enables the CPU 110 to realize the functions of machine learning models NA and NB described later. In the following, when the term "machine learning model" is used, the term means the function of the machine learning models NA and NB, or a computer program (module) that realizes the function.

A-2. Configuration of Machine Learning Model

Figure 2:
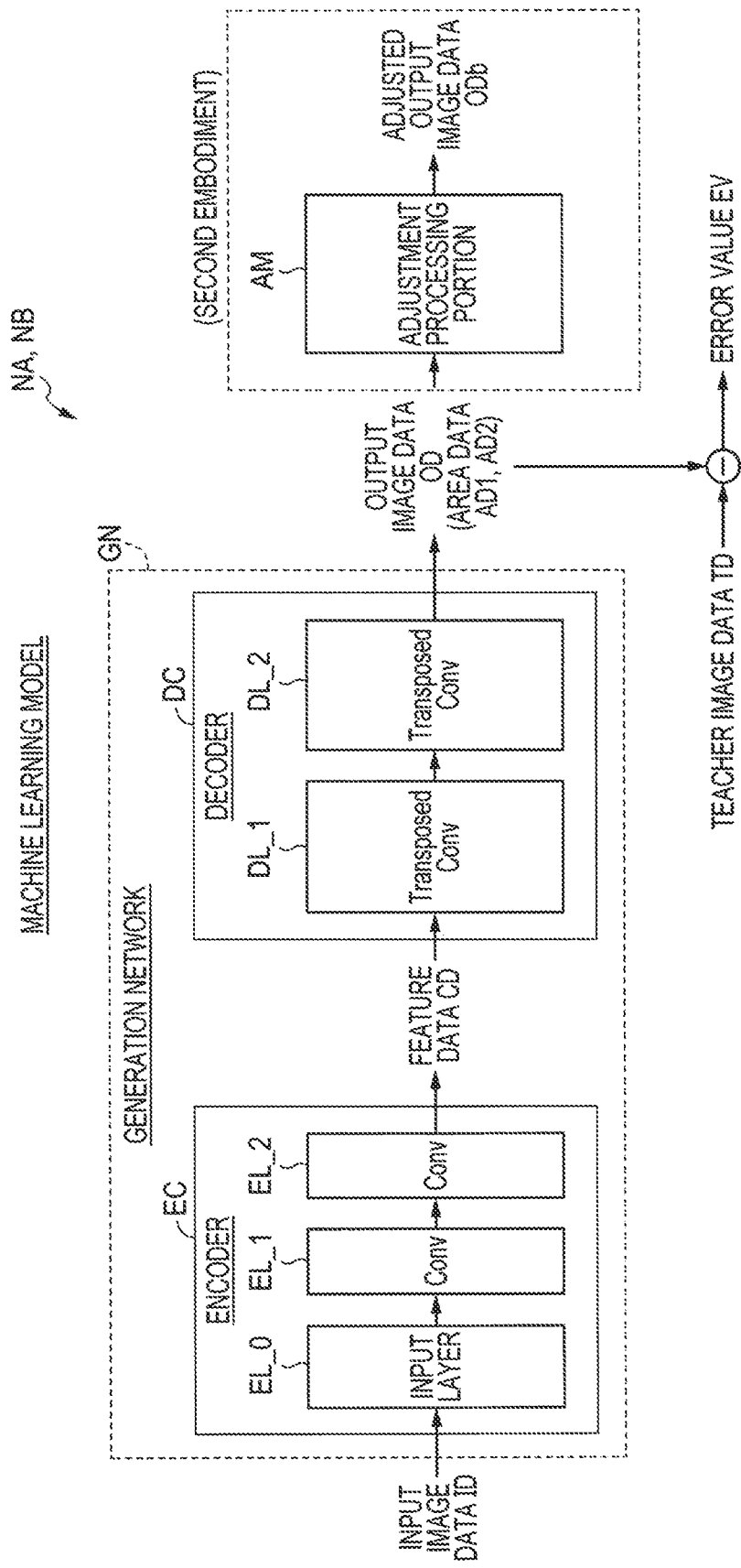
FIG. 2 is a block diagram showing the configuration of a machine learning model.

As shown in FIG. 2, the machine learning model NA, NB used in a first embodiment is a generation network GN. The machine learning model NA, NB used in a second embodiment described later include an adjustment processing portion AM in addition to the generation network GN. The adjustment processing portion AM will be described in the second embodiment.

In response to input of input image data ID, the generation network GN executes an operation using a plurality of parameters on the input image data ID to generate an output image data OD corresponding to the input image data ID, and outputs the output image data OD.

FIGS. 3A to 3C show an example of an input image and an output image. The input image data ID is, for example, bitmap data generated by photographing a subject (for example, a person or a landscape) by using a digital camera. In this embodiment, the input image data is RGB image data that represents the color of each pixel by RGB values. The RGB values are color values of the RGB color system including an R value, a G value, and a B value, which are gradation values (for example, 256 gradation values) of three color components of red (R), green (G), and blue (B). In the example of FIG. 3A, an input image II represented by the input image data ID includes a person's face FC as an object. The size of the input image II (the number of pixels in the vertical and horizontal directions) is adjusted to a size that is assumed as the input image data ID of the generation network GN by an enlargement process and a reduction process. In this embodiment, the input image II is a rectangular image of 257 pixels in the vertical direction and 257 pixels in the horizontal direction.

The output image data OD includes two area data AD1 and AD2 (FIG. 2). An edge enhancement area data AD1 is image data showing an edge enhancement area image EI (FIG. 3B). A smoothing area data AD2 is image data showing a smoothing area image SI (FIG. 3C). The area images EI and SI represented by the area data AD1 and AD2 are rectangular images having the same size (the vertical and horizontal numbers of pixels) as the input image II. Thus, the plurality of pixels of the input image II, the plurality of pixels of the edge enhancement area image EI, and the plurality of pixels of the smoothing area image SI have a one-to-one correspondence. In this embodiment, the values of the respective pixels of the area images EI and SI are the gradation values of 256 gradations from 0 to 255.

The edge enhancement area image EI is an image showing an edge enhancement area EA which is an area in the input image II in which it is preferable to perform the edge enhancement process. The hatched area of the edge enhancement area image EI in FIG. 3B is an edge enhancement area EA, and the unhatched area is an area different from the edge enhancement area EA (also referred to as a non-edge-enhancement area NEA). In the edge enhancement area image EI, the non-edge-enhancement area NEA is an area composed of pixels having a value of 0. In the edge enhancement area image EI, the edge enhancement area EA is an area composed of pixels having a value of 1 or larger (a value in the range of 1 to 255 in this embodiment).

The value of each pixel PX1 constituting the edge enhancement area EA is a parameter of the edge enhancement process (also referred to as an enhancement parameter P1). FIG. 3B shows an enlarged view of a part EAp of the edge enhancement area EA below the edge enhancement area image EI. The squares in the enlarged view indicate the pixels PX1, and the value shown in each pixel PX1 is an enhancement parameter P1.

The smoothing area image SI is an image showing a smoothing area SA, which is an area in the input image II in which it is preferable to execute the smoothing process. The hatched area of the smoothing area image SI in FIG. 3C is a smoothing area SA, and the unhatched area is an area different from the smoothing area SA (also referred to as a non-smoothing area NSA). In the smoothing area image SI, the non-smoothing area NSA is an area composed of pixels having a value of 0. In the smoothing area image SI, the smoothing area SA is an area composed of pixels having a value of 1 or more (a value in the range of 1 to 255 in this embodiment).

The value of each pixel PX2 constituting the smoothing area SA is a parameter of the smoothing process (also referred to as a smoothing parameter P2). In FIG. 3C, an enlarged view of a part SAp of the smoothing area SA is shown below the smoothing area image SI. The squares in the enlarged view indicate the pixels PX2, and the value shown in each pixel PX2 is the smoothing parameter P2.

The parameters P1 and P2 are values in the range of 1 to 255 as described above. The magnitude of the enhancement parameter P1 indicates the level of edge enhancement by the edge enhancement process. The magnitude of the smoothing parameter P2 indicates the degree of smoothing in the smoothing process. In the edge enhancement area EA, the portion where the enhancement parameter P1 is set to a value P1a is a portion where it is preferable to execute a higher level of edge enhancement process than the portion where the enhancement parameter P1 is set to a value P1b smaller than the value P1a. In the smoothing area SA, the portion where the smoothing parameter P2 is set to a value P2a is a portion where it is preferable to execute a higher level of smoothing process than the portion where the smoothing parameter P2 is set to a value P2b smaller than the value P2a.

As shown in FIG. 2, the generation network GN includes an encoder EC and a decoder DC.

The encoder EC executes a dimension reduction process on the input image data ID by using a plurality of parameters Pe, and generates feature data CD showing the feature (characteristics) of the input image data ID (that is, the feature of the input image II). In this embodiment, the input image data ID includes three component values (R value, G value, B value) of each of (257×257) pixels, and therefore data including (257×257×3) values, that is, (257×257×3) dimensional data. The feature data CD is (65×65×32) dimensional data in this embodiment.

FIG. 2 shows the configuration of the encoder EC. The encoder EC is a neural network having an input layer EL_0 and a plurality of convolution layers EL_1 and EL_2.

The input layer EL_0 is a layer into which the input image data ID is input. The input image data ID input to the input layer EL_1 is directly input to the first convolution layer EL_1. The data output from the input layer EL_1 is input to the second convolution layer EL_2.

The convolution layer EL_k (k is 1 or 2) executes arithmetic processing described later on the input data, and outputs, for example, (Ak×Bk×Ck) dimensional data. The Ak, Bk, Ck are positive integers, and in this embodiment, (A1×B1×C1)=(129×129×16), and (A2×B2×C2)=(65×65×32). The data output by the convolutional layer EL_2 is the feature data CD described above.

The arithmetic processing executed by the convolution layer EL_k includes a convolution process and a bias addition process. The convolution process is processing of sequentially applying s filters of (p×q×r) dimension to the input data ("s" is the number of filters) and calculating a correlation value indicating the correlation between the input data and the filter. In the processing of applying each filter, a plurality of correlation values are sequentially calculated while sliding the filter. One filter includes (p×q×r) weights. The bias addition process is a process of adding one bias prepared for one filter to the calculated correlation value. The (p×q×r×s) weights included in the s filters and the s biases corresponding to the s filters are the plurality of parameters Pe described above, and are values adjusted in the training process described later.

Each value of the data output by the convolution layer EL_k is a value obtained by performing particular post-processing on a value obtained by adding the bias to the above-mentioned correlation value. The number of values included in the data output by the convolutional layer EL_k (for example, (A1×B1×C1) in the case of the convolutional layer EL_1) is determined by the stride (the amount to slide the filter) in the convolution process and the number s of the filter.

The particular post-processing includes processing of inputting each value of data into an activation function and converting the data. In this embodiment, for example, a so-called ReLU (Rectified Linear Unit) is used as the activation function. In the particular post-processing, known processing such as batch normalization and dropout may be appropriately executed.

The decoder DC executes a dimension restoration process on the feature data CD generated by the encoder EC using a plurality of parameters Pd, and generates the output image data OD described above. In this embodiment, the feature data CD is (65×65×32) dimensional data as described above. In this embodiment, the output image data OD includes edge enhancement area data AD1 including (257×257×1) values and smoothing area data AD2 including (257×257×1) values. Thus, the output image data OD is (257×257×2) dimensional data.

FIG. 2 shows the configuration of the decoder DC. The decoder DC is a neural network having a plurality of transposed convolution layers DL_1 and DL_2.

The feature data CD is input to the first transposed convolution layer DL_1. The data output from the transposed convolutional layer DL_1 is input to the second transposed convolutional layer DL_2.

The transposed convolution layer DL_m (m is 1 or 2) executes the arithmetic processing described later on the input data, and generates, for example, (Dm×Em×Fm) dimensional data. The (Dm, Em, Fm) are positive integers, and in this embodiment, (D1×E1×F1)=(129×129×16), and (D2×E2×F2)=(257×257×2). The data output by the transposed convolution layer DL_2 is the output image data OD described above.

The arithmetic processing executed by the transposed convolution layer DL_m includes a transposed convolution process and a bias addition process. The transposed convolution process is a process of, after increasing the number of dimensions by appropriately adding a value (for example, a value of zero) to the input data depending on the stride, performing a convolution operation using a (p×q×r) dimensional filter in a similar manner to the convolution process described above. The bias addition process is a process of adding one bias prepared for one filter to the correlation value calculated by the transposed convolution operation. The (p×q×r×s) weights included in the s filters and the s biases corresponding to the s filters are the plurality of parameters Pd described above, and are values adjusted in the training process described later.

Each value of the data output by the transposed convolution layer DL_m is a value that is obtained by performing particular post-processing on a value obtained by adding a bias to the above-mentioned correlation value. The number of values included in the data generated by each transposed convolution layer DL_m (for example, (D1×E1×F1) in the case of the transposed convolution layer DL_1) is determined by the stride (the amount to add a value such as zero) in the transposed convolution process and the number s of filters.

The particular post-processing includes processing of inputting each value of data into an activation function and converting the data, as in the post-processing in the encoder EC. For example, in the post-processing of the transposed convolution layer DL_1, the above-mentioned ReLU is used as the activation function, and in the post-processing of the transposed convolution layer DL_2, a so-called sigmoid is used as the activation function. In the particular post-processing, known processing such as batch normalization and dropout may be appropriately executed.

The generation network GN as the machine learning model for person NA and the generation network GN as the machine learning model for landscape NB both have the configuration shown in FIG. 2. In the generation network GN as the machine learning model for person NA and the generation network GN as the machine learning model for landscape NB, different image groups are used in the training process described later. Thus, in a state after the training process is executed (the trained state), the parameters Pd and Pe of the encoder EC and the decoder DC have different values.

A-3. Training of Machine Learning Model

Figure 4:
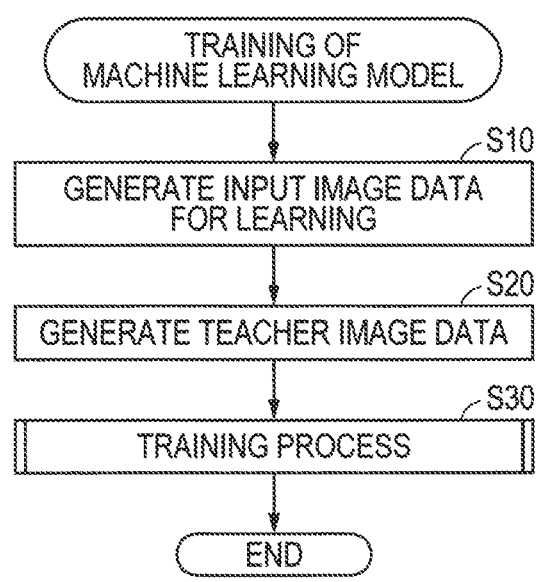
FIG. 4 is a flowchart showing the steps of training of the machine learning model.

As shown in the flowchart of FIG. 4, the machine learning model for person NA is trained to, when an input image data ID indicating a person's face FC is input, appropriately generate an output image data OD indicating the edge enhancement area EA and the smoothing area SA. The machine learning model for landscape NB is trained to, when an input image data ID indicating a landscape (not shown) is input, appropriately generate an output image data OD indicating the edge enhancement area EA and the smoothing area SA. The training of the machine learning models NA and NB is performed by, for example, the manufacturer of a printer 300 described later.

In S10, a plurality of input image data ID for learning are generated. Specifically, an operator captures (photographs) a subject belonging to a particular category (a person and a landscape in this embodiment) with a digital camera to generate an input image data ID indicating the subject. For example, a plurality of input image data ID indicating 100 or more different subjects are generated for each category. The plurality of input image data ID generated in this step are enlarged or reduced so as to have a size expected as the input image data ID of the generation network GN, and are stored, as an input image data group IGt for learning (FIG. 1), in the non-volatile storage device 130 of the training apparatus 100.

In S20, a plurality of teacher image data TD having a one-to-one correspondence with the plurality of input image data ID for learning are generated. The teacher image data TD is an output image data OD that should be output by the machine learning model when the corresponding input image data ID is input to the machine learning model. Thus, the teacher image data TD includes the edge enhancement area data AD1 and the smoothing area data AD2, similarly to the output image data OD described above.

The edge enhancement area data AD1 and the smoothing area data AD2 included in each teacher image data TD are created by an operator. For example, an experienced operator uses an image processing program (also called photo retouching software) to perform the edge enhancement process and the smoothing process on the corresponding input image data ID, thereby improving the appearance of the input image II. Then, edge enhancement area data AD1 is generated in which the area where the edge enhancement process is executed by the operator is shown as the edge enhancement area EA and the level of the edge enhancement process executed in that area by the operator is indicated as the enhancement parameter P1. Further, the smoothing area data AD2 is generated in which the area where the smoothing process is executed by the operator is shown as the smoothing area SA, and the level of the smoothing process executed in that area by the operator is shown as the smoothing parameter P2.

For example, as in the example of FIG. 3B, in the edge enhancement area data AD1 of the teacher image data TD corresponding to the input image data ID for person, the hair, eyes, nose, and mouth in the person's face FC is designated as the edge enhancement area EA. As in the example of FIG. 3C, in the smoothing area data AD2 of the teacher image data TD corresponding to the input image data ID for person, the flat skin areas such as the cheeks, forehead, and neck in the person's face FC are designated as the smoothing area SA. The plurality of teacher image data TD generated in this step are stored in the non-volatile storage device 130 of the training apparatus 100 as the teacher image data group TG (FIG. 1). Each of the plurality of teacher image data TD is associated with one input image data ID included in the input image data group for learning IGt.

By the processing of S10 and S20, a plurality of data pairs (for example, several hundred pairs) are generated for each category. For example, one data pair for a person includes input image data ID indicating a person's face and teacher image data TD (area data AD1, AD2) corresponding to the input image data ID.

Figure 5:
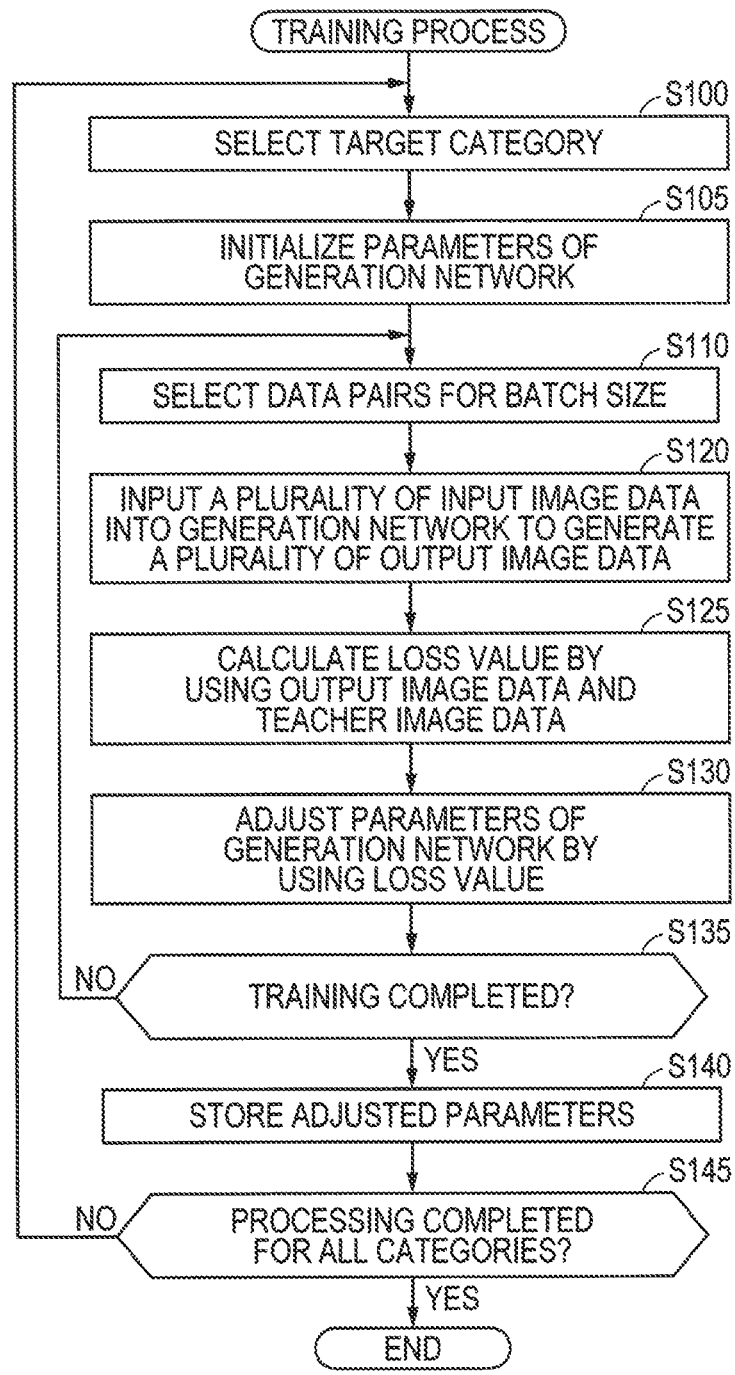
FIG. 5 is a flowchart of a training process.

In S30, the CPU 110 (FIG. 1) of the training apparatus 100 executes the training process in FIG. 5 by executing the computer program PG.

In S100, the CPU 110 selects one target category (for example, a person) from among a plurality of categories of images to be processed (in this embodiment, a person and a landscape).

In S105, the CPU 110 initializes parameters Pe and Pd of the generation network GN of the machine learning model for the target category. For example, the initial values of the parameters are set to random numbers obtained independently from the same distribution (for example, normal distribution).

In S110, the CPU 110 selects data pairs for a batch size from among the plurality of data pairs of the target category generated in S10 and S20 of FIG. 4. For example, the plurality of data pairs are divided into a plurality of groups (batch) each including V data pairs (V is an integer of 2 or more, for example, several tens). The CPU 110 selects the V sets of data pairs to be used, by sequentially selecting one group from these plurality of groups. Alternatively, the V sets of data pairs may be randomly selected from the plurality of data pairs each time.

In S120, the CPU 110 inputs the input image data ID of the selected V sets of data pairs to the generation network GN of the machine learning model for the target category, and generates V output image data OD corresponding to the V data pairs.

In S125, the CPU 110 calculates an error value EV between the output image data OD and the corresponding teacher image data TD for each of the V output image data OD. The teacher image data TD corresponding to the output image data OD is the teacher image data TD corresponding to the input image data ID input to the generation network GN when generating the output image data OD. The error value EV is calculated based on a particular loss function. For example, the error value EV is calculated based on the following equation (1).

$$EV = \frac{1}{257 \times 257 \times 2} \sum_{x=1}^{257} \sum_{y=1}^{257} \sum_{i=1}^{2} \sqrt{(O(x, y, i) - T(x, y, i))^2} \quad (1)$$

In the equation (1), "x" denotes the x-coordinate of the pixel, "y" denotes the y-coordinate of the pixel, and both take an integer value larger than or equal to 1 and smaller than or equal to 257. The "i" is an identifier indicating the edge enhancement area data AD1 and the smoothing area data AD2 included in the output image data OD and the teacher image data TD, and is 1 or 2. Specifically, i=1 indicates the edge enhancement area data AD1, and i=2 indicates the smoothing area data AD2. For example, O(x, y, 1) is the pixel value of the coordinates (x, y) in the edge enhancement area data AD1 of the output image data OD, and O(x, y, 2) is the pixel value of the coordinates (x, y) in the smoothing area data AD2 of the output image data OD. T(x, y, 1) is the pixel value of the coordinates (x, y) in the edge enhancement area data AD1 of the teacher image data TD, and T(x, y, 2) is the pixel value of the coordinates (x, y) in the smoothing area data AD2 of the teacher image data TD. The error value EV becomes smaller as the difference between the output image data OD and the teacher image data TD becomes smaller.

In S130, the CPU 110 adjusts a plurality of parameters Pe and Pd of the generation network GN by using V error values EV calculated for each of V sets of the output image data OD. Specifically, the CPU 110 adjusts the parameters according to a particular algorithm such that the error value EV becomes small. As the particular algorithm, for example, an algorithm using the backpropagation method and the gradient descent method (for example, adam) is used.

In S135, the CPU 110 determines whether the training has been completed. In this embodiment, it is determined that the training has been completed when a completion instruction from the operator is input, and it is determined that the training has not been completed when a training continuation instruction is input. For example, the CPU 110 inputs a plurality of test input image data ID different from the input image data ID for learning into the generation network GN, and generates a plurality of output image data OD. The operator evaluates the output image data OD to determine whether to end the training. The operator inputs a training completion instruction or a continuation instruction through the operation interface 140 depending on the evaluation result. In a modification, for example, it may be determined that the training has been completed when the processing of S110 to S130 is repeated a particular number of times.

In response to determining that the training has not been completed (S135: NO), the CPU 110 returns the processing to S110. In response to determining that the training has been completed (S135: YES), the CPU 110 ends the training of the generation network GN of the machine learning model for the target category, and in S140 stores the plurality of adjusted parameters Pe and Pd. At this point, the machine learning model for the target category is a trained model in which the parameters Pe and Pd have been adjusted. Thus, it can be said that this training is processing of generating (making) a trained machine learning model.

In S145, the CPU 110 determines whether all the categories to be processed (person and landscape in this embodiment) have been processed. If there is an unprocessed category (S145: NO), the CPU 110 returns the processing to S100. When all the categories have been processed (S145: YES), the CPU 110 ends the training process. By the above training process, adjusted parameters Pe and Pd are generated for each category. That is, a trained machine learning model is generated for each category.

A-4. Printing Process

A printing process executed using trained machine learning models NA and NB trained by using the above-described training process will be described.

Figure 6:
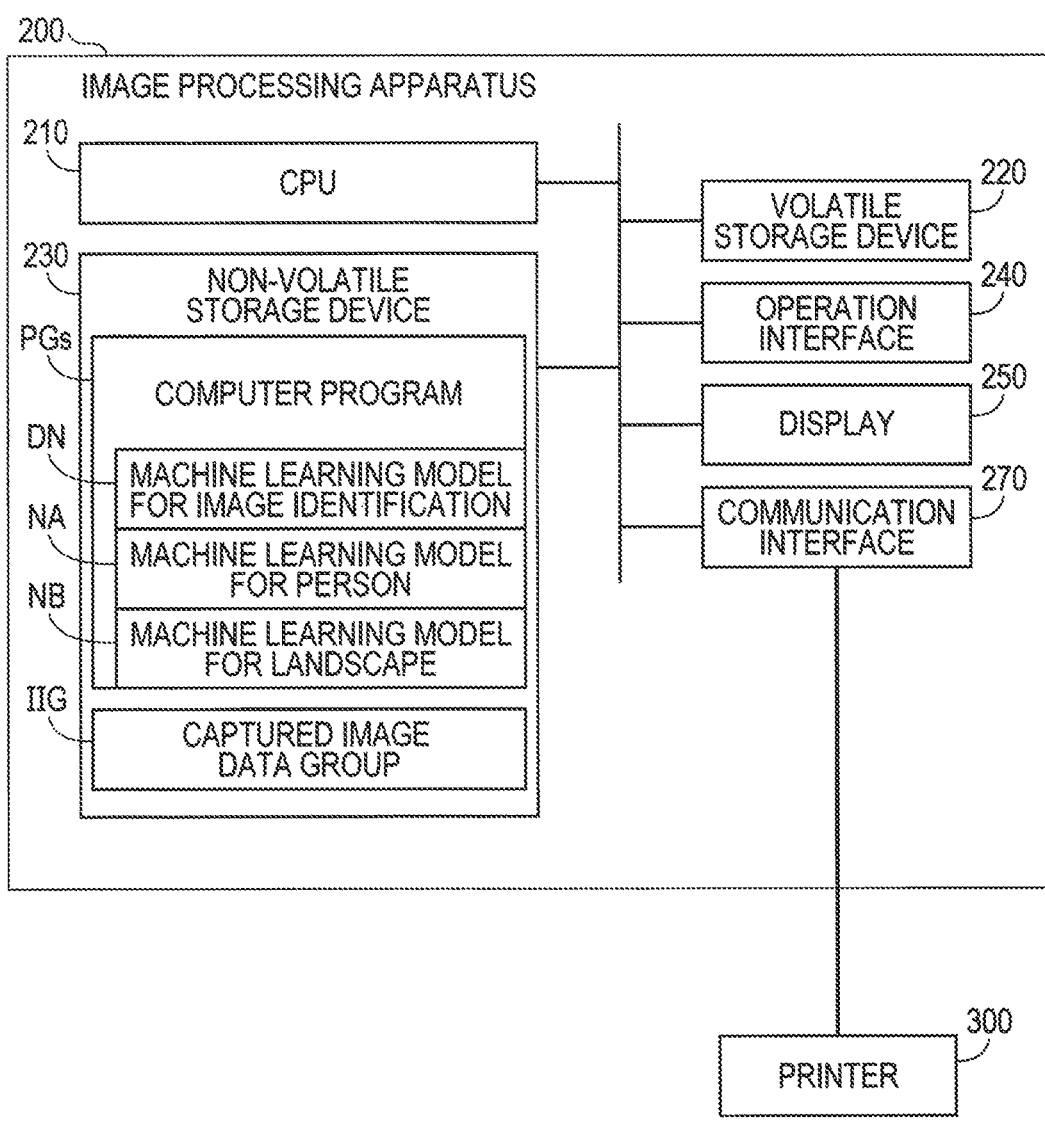
FIG. 6 is a block diagram showing the configuration of an image processing apparatus 200.

As shown in FIG. 6, the image processing apparatus 200 is, for example, a computer such as a personal computer or a smartphone used by a user of the printer 300. Similar to the training apparatus 100, the image processing apparatus 200 includes a CPU 210 as a controller of the image processing apparatus 200, a volatile storage device 220 such as a RAM, a non-volatile storage device 230 such as a hard disk drive and a flash memory, an operation interface 240 such as a keyboard and a mouse, a display 250 such as a liquid crystal display, and a communication interface (IF) 270. The communication interface 270 is an interface for connecting to an external device, for example, the printer 300.

The non-volatile storage device 230 stores a computer program PGs and captured image data group IIG. The captured image data group IIG includes a plurality of captured image data. The captured image data is image data owned by the user, and is, for example, RGB image data generated by photographing a subject with a digital camera. In this embodiment, the subject is either a person or a landscape.

The computer program PGs is, for example, an application program provided by the manufacturer of the printer 300 and is installed in the image processing apparatus 200. The computer program PGs is provided in a form downloaded from a particular server or stored in a CD-ROM, a DVD-ROM, and so on. The CPU 210 executes the printing process by executing the computer program PGs.

The computer program PGs includes the trained machine learning models NA and NB. The computer program PGs includes a machine learning model DN for image identification in addition to the machine learning models NA and NB.

The machine learning model DN for image identification is a so-called Convolutional Neural Network having a plurality of layers (not shown) including a convolutional layer and a pooling layer. When image data of a particular size is input, the machine learning model DN executes calculation on the image data and outputs identification data indicating the category of the image indicated by the image data ID. The particular size of the input image data is, for example, the same size as the input image data ID described above. In this embodiment, since the image indicated by the input image data is either a person or a landscape, the image is classified into either a person or a landscape.

As the machine learning model DN for image identification, for example, a known 19-layer convolutional neural network such as VGG16 and VGG19 is used. The VGG16 and VGG19 are trained neural networks trained by using image data registered in an image database called ImageNet, and the trained parameters are open to the public.

Figure 7:
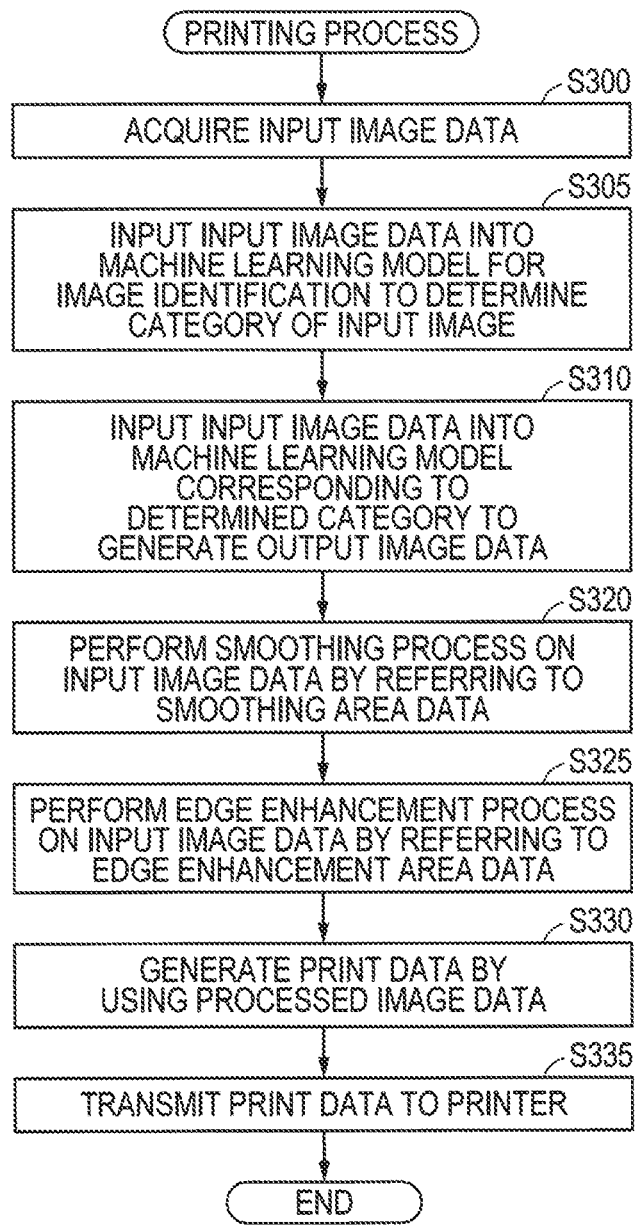
FIG. 7 is a flowchart of a printing process according to a first embodiment.

In S300 of the printing process in FIG. 7, the CPU 210 acquires input image data. For example, the CPU 210 acquires one captured image data specified by a user as the input image data ID from the captured image data group IIG stored in the non-volatile storage device 230.

In S305, the CPU 210 inputs the input image data ID to the machine learning model DN for image identification and determines the category of the input image II indicated by the input image data ID. The size of the input image data ID may differ from a particular size assumed to be the size of image data input to the machine learning model DN for image identification. For this reason, the CPU 210 performs a size adjustment process (enlargement process or reduction process) on the input image data ID to adjust the size of the input image data ID to the particular size assumed to be the size of image data input to the machine learning model DN. The CPU 210 inputs the input image data ID adjusted in size to the machine learning model DN, and causes the machine learning model DN to output identification data. Based on the output identification data, the CPU 210 determines the category of the input image II. The following description will be given on the assumption that the input image II is an image indicating a person's face and the category of the input image II is determined to be "person."

In S310, the CPU 210 inputs the input image data ID to the machine learning model NA, NB corresponding to the determined category, and generates the output image data OD. More specifically, the CPU 210 performs the size adjustment process (enlargement process or reduction process) on the input image data ID to adjust the size of the input image data ID to a size assumed to be the size of the input image data ID for the machine learning model NA, NB (in this embodiment, 257 pixels vertically and 257 pixels horizontally). If the category of the input image II is determined to be "person" in S305, the CPU 210 inputs the input image data ID adjusted in size to the machine learning model for person NA, and causes the machine learning model NA to generate the output image data OD. As described above, the output image data OD includes the edge enhancement area data AD1 and the smoothing area data AD2.

Although the input image data ID for learning used in the training described above and the input image data ID in the printing process are different data, both of them are image data indicating a person's face. Thus, for the convenience of description, the description of the printing process will be given on the assumption that the input image II shown in FIG. 3A is an image indicated by the input image data ID in the printing process. Likewise, the description of the printing process will be given on the assumption that the edge enhancement area image EI shown in FIG. 3B is an image indicated by the edge enhancement area data AD1 generated in S310, and the smoothing area image SI shown in FIG. 3C is an image indicated by the smoothing area data AD2 generated in S310.

In S320, the CPU 210 performs the smoothing process on the input image data ID before the size adjustment by referring to the smoothing area data AD2 generated in S310. More specifically, the CPU 210 performs the following processing on all pixels in the input image II (FIG. 3A) as the target pixel. The CPU 210 specifies a corresponding pixel in the smoothing area image SI (FIG. 3C) corresponding to the target pixel in the input image II. If the corresponding pixel has a value of 0, the CPU 210 determines that the target pixel is not to be subjected to the smoothing process. If the corresponding pixel has a value larger than or equal to 1, the CPU 210 determines that the target pixel is to be subjected to the smoothing process. If the target pixel is to be subjected to the smoothing process, the CPU 210 performs the smoothing process on the target pixel.

As the smoothing process, processing using a Gaussian filter is performed, for example. More specifically, when the coordinates of the target pixel are defined as (x, y) and the value of the target pixel after being subjected to the smoothing process of this embodiment is defined as S(x, y), S(x, y) is calculated by using an equation (2-1) and an equation (2-2) given below:

$$G(i, j) = \frac{1}{2\pi\sigma^2}\exp\left(-\frac{i^2 + j^2}{2\sigma^2}\right) \quad (2\text{-}1)$$

$$S(x, y) = \sum_{i=-r}^{r}\sum_{j=-r}^{r} P(x+i, y+j)G(i, j) \quad (2\text{-}2)$$

The equation (2-1) is an equation for calculating a coefficient G(i, j) of the Gaussian filter. The equation (2-2) is an equation for calculating S(x, y) by performing convolution operation using the coefficient G(i, j). G(i, j) is a coefficient of the Gaussian filter in coordinates (x+i, y+j). In the equation (2-2), P(x+i, y+j) is the value of the target pixel in the coordinates (x+i, y+j) before being subjected to the smoothing process. The equation (2-1) and the equation (2-2) include σ and r respectively that are values indicating the level of the smoothing process. The level of the smoothing process becomes higher as r and σ become larger. As the level of the smoothing process becomes higher, an edge amount is decreased to a larger degree by the smoothing process. In this embodiment, σ is set to a fixed value (1 in this embodiment). The r is determined by using an equation (3) below based on the value of the corresponding pixel in the smoothing area data AD2 corresponding to the target pixel, namely, based on the smoothing parameter P2 (FIG. 3C) defined for the corresponding pixel.

$$r = 1 + \left(\frac{P2 - 1}{254}\right) \quad (3)$$

As understood from the equation (3), r becomes larger as the smoothing parameter P2 defined for the corresponding pixel becomes larger, and increases the level of the smoothing process on the target pixel.

The CPU 210 calculates a weighted average of pixel values in a particular range (5 pixels vertically and 5 pixels horizontally, for example) centered on the target pixel using the coefficient G of the Gaussian filter as a weight, and employs the calculated weighed average as the value of the target pixel after being subjected to the smoothing process.

The edge amount in the input image II after being subjected to the smoothing process is smaller than the edge amount in the input image II before being subjected to the smoothing process. Thus, the smoothing process is regarded as image processing of decreasing an edge amount in an image. For example, an edge amount in an image is a total value of edge amounts of each pixel calculated by using an edge detection filter (a Sobel filter, for example).

In S325, the CPU 210 performs the edge enhancement process on the input image data ID after being subjected to the smoothing process by referring to the edge enhancement area data AD1 generated in S310. More specifically, the CPU 210 performs the following processing on all the pixels in the input image II after being subjected to the smoothing process as the target pixels. The CPU 210 specifies a corresponding pixel in the edge enhancement area image EI (FIG. 3B) corresponding to a target pixel in the input image II after being subjected to the smoothing process. If the corresponding pixel has a value of 0, the CPU 210 determines that the target pixel is not to be subjected to the edge enhancement process. If the corresponding pixel has a value larger than or equal to 1, the CPU 210 determines that the target pixel is to be subjected to the edge enhancement process. If the target pixel is to be subjected to the edge enhancement process, the CPU 210 performs the edge enhancement process on the target pixel.

As the edge enhancement process, an unsharp mask process is performed, for example. More specifically, when the coordinates of the target pixel are defined as (x, y) and the value of the target pixel after being subjected to the edge enhancement process of this embodiment is defined as E(x, y), the E(x, y) is calculated by using an equation (4) given below:

$$E(x,y) = P(x,y) + a \times |P(x,y) - S(x,y)| \quad (4)$$

In the equation (4), P(x, y) is the value of the target pixel before being subjected to the edge enhancement process, in this embodiment, which is the value of the target pixel in a partial image PI on which the smoothing process has been performed. In the equation (4), S(x, y) is a value obtained by performing a smoothing process on the target pixel before being subjected to the edge enhancement process. This smoothing process as a part of the edge enhancement process is performed separately from the smoothing process in S320. In this embodiment, S(x, y) is calculated with the setting of r=3 and σ=1 in the equations (2-1) and (2-2) described above.

In the equation (4), "a" is a coefficient indicating the level of the edge enhancement process. The level of the edge enhancement process becomes higher as "a" becomes larger. As the level of the edge enhancement process becomes higher, an edge amount is increased to a larger degree by the edge enhancement process. In this embodiment, "a" is determined by using an equation (5) given below based on the value of the corresponding pixel in the edge enhancement area data AD1 corresponding to the target pixel, namely, based on the enhancement parameter P1 (FIG. 3B) defined for the corresponding pixel.

$$a = 50 + \left\{ \frac{50(P1 - 1)}{254} \right\} \quad (5)$$

As understood from the equation (5), "a" becomes larger as the enhancement parameter P1 defined for the corresponding pixel becomes larger, and increases the level of the edge enhancement process on the target pixel.

The edge amount in the input image II after being subjected to the edge enhancement process is larger than the edge amount in the input image II before being subjected to the edge enhancement process. Thus, the edge enhancement process is regarded as image processing of increasing an edge amount in an image.

In S330, the CPU 210 generates print data by using the input image data ID (hereinafter also referred to as "processed image data") after being subjected to the edge enhancement process in S325. For example, the CPU 210 performs a color conversion process and a halftone process on the processed input image data ID (RGB image data) to generate print data indicating a dot formation state of each pixel. The dot formation state is a two-level state indicating "without dot" and "with dot," or a four-level state indicating "without dot," "small," "middle," and "large," for example. In S335, the CPU 210 transmits the print data to the printer 300. When the print data is received, the printer 300 prints the image by using the received print data. Then, as a result of the smoothing process and the edge enhancement process performed in appropriate areas, the image with improved appearance is printed.

In the first embodiment, the trained machine learning model NA, NB is trained so as to generate the output image data OD indicating the edge enhancement area EA that is an area in the input image II in which it is preferable to perform the edge enhancement process, and the smoothing area SA that is an area in the input image II in which it is preferable to perform the smoothing process (FIGS. 3A to 3C and 5). As a result, by causing the trained machine learning model NA, NB to generate the output image data OD (S310 in FIG. 7) in the printing process and so on (FIG. 7), for example, it becomes possible to specify the edge enhancement area EA and the smoothing area SA appropriately. Thus, the edge enhancement process and the smoothing process can be performed in respective preferred areas in the input image II during the printing process and so on, for example. As a result, the appearance of the input image II can be improved appropriately, for example.

If the input image II indicates a person, for example, for reasons such as variations in size, orientation, position, and so on of the face of the person appearing in the input image II, it is not easy to specify the edge enhancement area EA in which it is preferable to perform the edge enhancement process or the smoothing area SA in which it is preferable to perform the smoothing process based on a relatively simple process such as an edge extraction process, for example. For performing the edge enhancement process and the smoothing process while trying to avoid an unnatural appearance, for example, the edge enhancement area EA and the smoothing area SA are often set based on sense or know-how (experiences) of an experienced operator, for example. This makes it difficult for a human to explain a method of setting the edge enhancement area EA or the smoothing area SA in words or express such a method using a mathematical formula. On the other hand, the characteristic of such a setting method based on sense or know-how appears in the teacher image data TD resulting from setting actually made by the operator. For this reason, in this embodiment, a machine learning model is caused to learn the characteristic of a technique of setting the edge enhancement area EA or the smoothing area SA by using a plurality of data pairs each including the teacher image data TD, thereby training the machine learning model NA, NB so as to output the output image data OD indicating the appropriate edge enhancement area EA and smoothing area SA.

In this embodiment, the output image data OD includes the edge enhancement area data AD1 in which each of the values of a plurality of pixels corresponding to the edge enhancement area EA indicates the enhancement parameter P1 for the edge enhancement process. As a result, by causing the trained machine learning model NA, NB to generate the output image data OD (S310 in FIG. 7), it becomes possible to specify the parameter P1 appropriately for the edge enhancement process to be performed on the edge enhancement area EA, in addition to specifying the edge enhancement area EA. Likewise, the output image data OD includes the smoothing area data AD2 in which each of the values of a plurality of pixels corresponding to the smoothing area SA indicates the smoothing parameter P2 for the smoothing process. As a result, by causing the trained machine learning model NA, NB to generate the output image data OD (S310 in FIG. 7), it becomes possible to specify the smoothing parameter P2 appropriately for the smoothing process to be performed on the smoothing area SA, in addition to specifying the smoothing area SA.

For performing the edge enhancement process and the smoothing process, the enhancement parameter P1 and the smoothing parameter P2 are often set based on sense or know-how of an experienced operator, for example, like the setting of the edge enhancement area EA and the smoothing area SA. This makes it difficult for a human to explain a method of setting the level of the enhancement parameter P1 or the smoothing parameter P2 or setting a way in which the enhancement parameter P1 or the smoothing parameter P2 is to be changed in words or express such a method using a mathematical formula. On the other hand, the characteristic of such a setting method based on sense or know-how appears in the teacher image data TD resulting from setting actually made by the operator. For this reason, in this embodiment, a machine learning model is caused to learn the characteristic of a technique of setting the enhancement parameter P1 or the smoothing parameter P2 by using a plurality of data pairs each including the teacher image data TD, thereby training the machine learning model NA, NB so as to allow output of the output image data OD indicating the appropriate enhancement parameter P1 and the smoothing parameter P2.

In this embodiment, the output image data OD includes the edge enhancement area data AD1 indicating the edge enhancement area EA, and the smoothing area data AD2 indicating the smoothing area SA. As a result, providing the edge enhancement area data AD1 and the smoothing area data AD2 as different data makes it possible to make setting so as to generate an overlap between the smoothing area SA and the edge enhancement area EA, for example. In the example of FIGS. 3A to 3C, for example, a nose upper portion NS of a person's face is set both in the smoothing area SA and the edge enhancement area EA (FIGS. 3A to 3C). This achieves implementation of flexible image processing using the output image data OD. The teacher image data TD also includes the edge enhancement area data AD1 and the smoothing area data AD2 prepared as different data, thereby allowing a technique of setting the smoothing area SA and the edge enhancement area EA to be expressed more flexibly in the teacher image data TD. Even if the edge enhancement area data AD1 and the smoothing area data AD2 are generated by different operators, the generated edge enhancement area data AD1 and smoothing area data AD2 are available for use without requiring particular adjustment.

In this embodiment, the edge enhancement process is image processing of increasing an edge amount that is one type of feature values of an image, and the smoothing process is image processing of decreasing such an edge amount. In some cases, it is preferable to perform several types of image processing to achieve opposing effects in this way on the input image II. Regarding areas in which it is preferable to perform respective types of image processing opposing each other, this embodiment allows appropriately specifying each of these areas for each type of image processing.

In this embodiment, the trained machine learning model includes the machine learning model for person NA trained by using a plurality of data pairs for person, and the machine learning model for landscape NB trained by using a plurality of data pairs for landscape. In some cases, a technique of setting the smoothing area SA or the edge enhancement area EA or a technique of setting the parameter P1 or P2 is changed in a manner that depends on the category of an object in the input image II. In the input image II indicating a person, an area mainly including hair, eyes, a nose, a mouth, and so on is set as the edge enhancement area EA, and an area mainly including a flat skin is set as the smoothing area SA, for example. In the input image II indicating landscape, for example, an area in a foreground having a relatively large edge amount may preferably be set as the edge enhancement area EA, and an area in a background having a relatively small edge amount may preferably be set as the smoothing area SA, for example. In such cases, it is preferable that a trained machine learning model dedicated to a particular category be prepared for each category. The reason for this is that, by causing a machine learning model to learn only the characteristic of a setting technique for an object in the particular category using a data pair in the particular category, it becomes possible to train the machine learning model so as to specify the smoothing area SA or the edge enhancement area EA with high accuracy in response to input of the input image data ID in the particular category. In this embodiment, since the machine learning model for person NA and the machine learning model for landscape NB are provided, the smoothing area SA and the edge enhancement area EA can be specified with high accuracy in each of input image data indicating a person and input image data indicating landscape, for example.

In the image processing apparatus 200 of this embodiment, the CPU 210, which inputs the input image data ID to the trained machine learning model NA, NB to cause the machine learning model NA, NB to generate the output image data OD corresponding to the input image data ID (S310 in FIG. 7), is an example of a generator. The CPU 210, which performs the edge enhancement process on data belonging to the input image data ID and indicating the edge enhancement area EA specified by using the output image data OD (S325 in FIG. 7) and the smoothing process on data belonging to the input image data ID and indicating the smoothing area SA specified by using the output image data OD (S320 in FIG. 7), is an example of an image processor. As a result, by causing the trained machine learning model NA, NB to generate the output image data OD, the image processing apparatus 200 becomes capable of specifying the edge enhancement area EA and the smoothing area SA in the input image II appropriately. This allows the image processing apparatus 200 to perform the edge enhancement process and the smoothing process in respective preferred areas in the input image II, for example. Thus, the appearance of the input image II can be improved, for example.

If there is a part in which the edge enhancement area EA and the smoothing area SA overlap each other, the effect of either the smoothing process or the edge enhancement process that is performed before the other process is weakened by the process that is performed later. Comparison between the smoothing process and the edge enhancement process shows that the effect of the edge enhancement process is more visible than the effect of the smoothing process to produce significant effect of improving the appearance of an image. For this reason, when there is a part in which the edge enhancement area EA and the smoothing area SA overlap each other, performing the edge enhancement process after the smoothing process is preferable in terms of improving the appearance of an image. The image processing apparatus 200 of this embodiment performs the edge enhancement process (S325 in FIG. 7) after performing the smoothing process (S320 in FIG. 7) on the input image data ID. By doing so, even when there is an overlap between the edge enhancement area EA and the smoothing area SA, the smoothing process and the edge enhancement process are still performed appropriately, allowing the appearance of the input image II to be improved more effectively.

In the training of a machine learning model of this embodiment (FIG. 4), the step of generating and acquiring a plurality of the input image data ID for learning (S10 in FIG. 4) is an example of a first acquisition step. The step of generating and acquiring a plurality of the teacher image data TD corresponding to the respective input image data ID for learning (S20 in FIG. 4) is an example of a second acquisition step. The step of adjusting the plurality of parameters Pe, Pd used for operation of the machine learning model NA, NB by using a plurality of data pairs each including the input image data ID for learning and the teacher image data TD (S30 in FIG. 4 and S110 to S130 in FIG. 5) is an example of an adjustment step. The training of the machine learning model of this embodiment allows training of the machine learning model NA, NB so as to generate the output image data OD indicating the edge enhancement area EA and the smoothing area SA. Thus, by causing the trained machine learning model NA, NB to generate the output image data OD (S310 in FIG. 7) in the printing process and so on (FIG. 7), for example, the edge enhancement area EA and the smoothing area SA can be specified appropriately.

B. Second Embodiment

As shown in FIG. 2, in a second embodiment, each of the machine learning models NA, NB includes an adjustment processing portion AM that performs an area adjustment process on the output image data OD to generate adjusted output image data ODb. More specifically, the CPU 210 functioning as the adjustment processing portion AM performs the area adjustment process in a printing process of the second embodiment will be described next.

Figure 8:
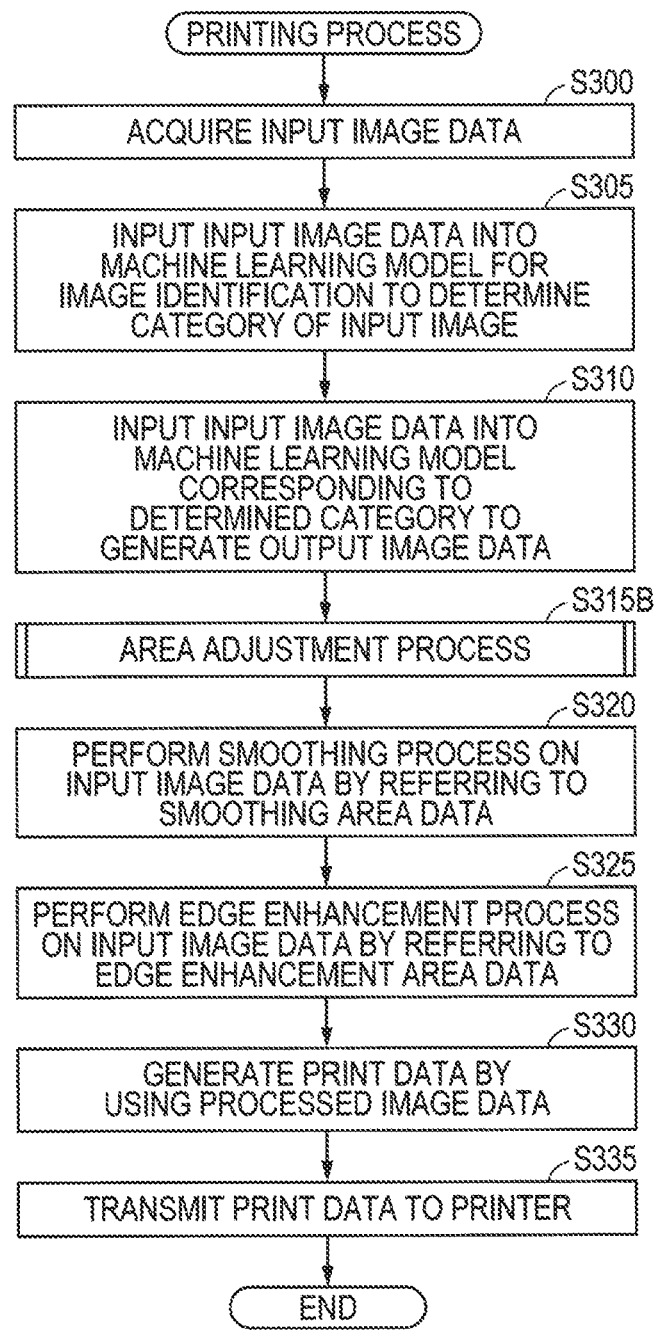
FIG. 8 is a flowchart of a printing process according to a second embodiment.

In the printing process of the second embodiment shown in FIG. 8, the CPU 210 performs an area adjustment process in S315B between S310 and S320 of the printing process of the first embodiment shown in FIG. 7. The area adjustment process is to adjust the edge enhancement area data AD1 and the smoothing area data AD2 so as to avoid an overlap between the edge enhancement area EA and the smoothing area SA. The other processes of the printing process in FIG. 8 are the same as the processes given the same signs in FIG. 7, so that description of these processes will be omitted.

Figure 9:
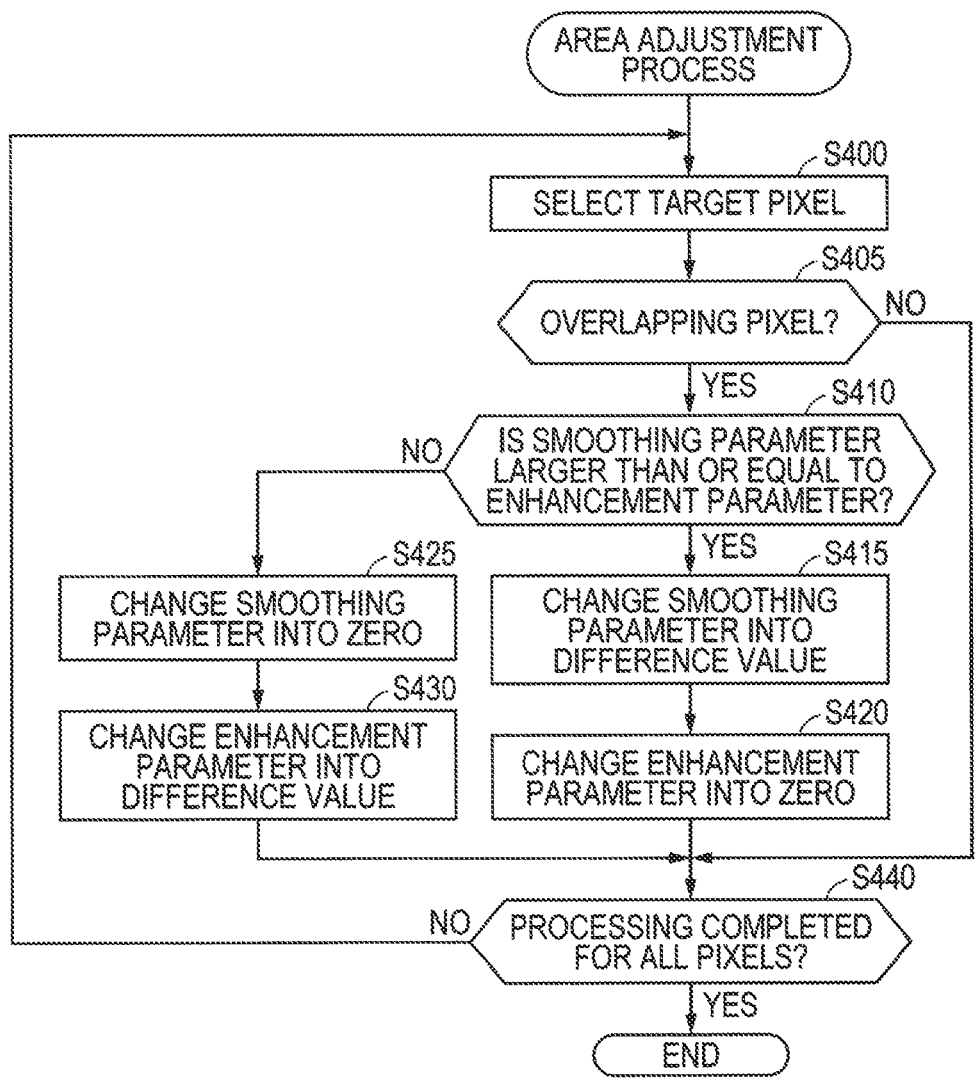
FIG. 9 is a flowchart of an area adjustment process according to the second embodiment.

FIG. 9 is a flowchart of the area adjustment process corresponding to S315B in FIG. 8. In S400, the CPU 210 selects one target pixel from a plurality of pixels in the edge enhancement area image EI (FIG. 3B) indicated by the edge enhancement area data AD1 of the output image data OD generated in S310.

In S405, the CPU 201 determines whether the target pixel is an overlapping pixel. If the target pixel in the edge enhancement area image EI is a pixel forming the edge enhancement area EA and if a corresponding pixel in the smoothing area image SI corresponding to the target pixel is a pixel forming the smoothing area SA, the CPU 210 determines that the target pixel is an overlapping pixel. If the target pixel in the edge enhancement area image EI is not a pixel forming the edge enhancement area EA or if a corresponding pixel in the smoothing area image SI corresponding to the target pixel is not a pixel forming the smoothing area SA, the CPU 210 determines that the target pixel is not an overlapping pixel.

If the target pixel is an overlapping pixel (S405: YES), the CPU 201 determines in S410 whether the smoothing parameter P2 for the corresponding pixel defined in the smoothing area data AD2 is larger than or equal to the enhancement parameter P1 for the target pixel defined in the edge enhancement area data AD1.

If the smoothing parameter P2 for the corresponding pixel is larger than or equal to the enhancement parameter P1 for the target pixel (S410: YES), performing the smoothing process is considered to be more preferable than performing the edge enhancement process. Thus, the CPU 210 performs S415 and S420.

In S415, the CPU 210 changes the smoothing parameter P2 for the corresponding pixel into a difference value (P2−P1) between the smoothing parameter P2 for the corresponding pixel and the enhancement parameter P1 for the target pixel. Namely, the CPU 210 changes the value of the corresponding pixel in the smoothing area data AD2 into the difference value (P2−P1). By doing so, it is determined that a pixel in the input image II corresponding to the target pixel and the corresponding pixel is to be subjected to the smoothing process using the difference value (P2−P1) as a parameter.

In step S420, the CPU 210 changes the enhancement parameter P1 for the target pixel into 0. Namely, the CPU 210 changes the value of the target pixel in the edge enhancement area data AD1 into 0. By doing so, it is determined that the pixel in the input image II corresponding to the target pixel and the corresponding pixel is not to be subjected to the edge enhancement process.

If the smoothing parameter P2 for the corresponding pixel is less than the enhancement parameter P1 for the target pixel (S410: NO), performing the edge enhancement process is considered to be more preferable than performing the smoothing process. Thus, the CPU 210 performs S425 and S430.

In S425, the CPU 210 changes the smoothing parameter P2 for the corresponding pixel into 0. Namely, the CPU 210 changes the value of the corresponding pixel in the smoothing area data AD2 into 0. By doing so, it is determined that a pixel in the input image II corresponding to the target pixel and the corresponding pixel is not to be subjected to the smoothing process.

In S430, the CPU 210 changes the enhancement parameter P1 for the target pixel into a difference value (P1−P2). Namely, the CPU 210 changes the value of the target pixel in the edge enhancement area data AD1 into the difference value (P1−P2). By doing so, it is determined that the pixel in the input image II corresponding to the target pixel and the corresponding pixel is to be subjected to the edge enhancement process using the difference value (P1−P2) as a parameter.

If the target pixel is not an overlapping pixel (S405: NO), the CPU 201 skips S410 to S430 to advance the processing forward to S440.

In S440, the CPU 210 determines whether all pixels in the edge enhancement area image EI have been processed. If there is an unprocessed pixel (S440: NO), the CPU 210 returns the processing to S400. If all the pixels in the edge enhancement area image EI have been processed (S440: YES), the CPU 210 finishes the area adjustment process.

FIG. 10A shows an example of a part of the edge enhancement area image EI and an example of a part of the smoothing area image SI each in a state before being adjusted by the area adjustment process. FIG. 10B shows an example of a part of an edge enhancement area image EIb and an example of a part of a smoothing area image SIb each in a state after being adjusted by the area adjustment process. The parts of the edge enhancement area images EI and EIb and the parts of the smoothing area images SI and SIb shown in FIGS. 10A and 10B correspond each other.

In FIG. 10A, in the edge enhancement area image EI before the adjustment, pixels in the first row from the top have values (enhancement parameters P1) of 250. In the smoothing area image SI before the adjustment, pixels in the first row from the top have values (smoothing parameters P2) of 200. If these pixels are target pixel, the smoothing parameters P2 (200) are determined to be less than the enhancement parameters P1 (250) (NO in S410). Thus, as shown in FIG. 10B, in the edge enhancement area image EIb after the adjustment, the values of pixels (enhancement parameters P1) in the first row from the top are set to a difference value of 50 (S430). In the smoothing area image SIb after the adjustment, the values of pixels (smoothing parameters P2) in the first row from the top are set to 0 (S425).

In FIG. 10A, in the edge enhancement area image EI before the adjustment, pixels in the second row from the top have values (enhancement parameters P1) of 200. In the smoothing area image SI before the adjustment, pixels in the second row from the top have values (smoothing parameters P2) of 200. If these pixels are target pixel, as the smoothing parameters P2 (200) and the enhancement parameters P1 (200) are equal to each other, the smoothing parameters P2 are determined to be larger than or equal to the enhancement parameters P1 (YES in S410). A difference value between the smoothing parameters P2 and the enhancement parameters P1 is 0. Thus, as shown in FIG. 10B, in the edge enhancement area image EIb after the adjustment and the smoothing area image SIb after the adjustment, the values of pixels (enhancement parameters P1) in the second row from the top and the values of pixels (smoothing parameters P2) in the second row from the top are both set to 0.

In FIG. 10A, in the edge enhancement area image EI before the adjustment, pixels in the third and fourth rows from the top have values (enhancement parameters P1) of 100 and 50 respectively. In the smoothing area image SI before the adjustment, pixels in the third and fourth rows from the top have values (smoothing parameters P2) of 200. If these pixels are target pixel, the smoothing parameters P2 (200) are determined to be larger than or equal to the enhancement parameters P1 (100, 50) (YES in S410). Thus, as shown in FIG. 10B, in the edge enhancement area image EIb after the adjustment, the values of pixels (enhancement parameters P1) in the third and fourth rows from the top are set to 0 (S420). In the smoothing area image SIb after the adjustment, the values of pixels (smoothing parameters P2) in the third and fourth rows from the top are set to 100 and 150 respectively (S415).

In the second embodiment, the CPU 210, which functions as the adjustment processing portion AM for each of the trained machine learning models NA, NB, generates the adjusted output image data ODb (adjusted area data AD1, AD2) by using the edge enhancement area data AD1 and the smoothing area data AD2 (S315B in FIG. 8, and FIGS. 9 and 10). When there is an overlap between the edge enhancement area EA and the smoothing area SA (YES in S405 in FIG. 9), the adjusted output image data ODb (adjusted area data AD1, AD2) is data indicating the edge enhancement area EA and the smoothing area SA adjusted so as to avoid an overlap therebetween (FIG. 10). As a result, when the edge enhancement process and the smoothing process are performed by using the adjusted output image data ODb (S320 and S325 in FIG. 8), it is suppressed that both the edge enhancement process and the smoothing process are overlappingly performed in a particular area. This reduces total processing amount in the edge enhancement process and the smoothing process to allow execution of the processing at higher speed. In the second embodiment, as overlapped executions of both of the edge enhancement process and the smoothing process are suppressed in a particular area, the smoothing process and the edge enhancement process may be performed in the reversed order.

In the second embodiment, based on the enhancement parameter P1 and the smoothing parameter P2, image processing to be performed (edge enhancement process or smoothing process) and a parameter to be used (a difference value between P1 and P2) are determined for an overlapping area (an area composed of the foregoing overlapping pixel) in which there is an overlap between the edge enhancement area EA indicated by the edge enhancement area data AD1 before the adjustment and the smoothing area SA indicated by the smoothing area data AD2 before the adjustment (S410 to S430 in FIG. 9). Then, the adjusted output image data ODb (adjusted area data AD1, AD2) indicating the image processing to be performed and the parameter to be used is generated (FIGS. 10A and 10B). As a result, it becomes possible to generate the adjusted output image data ODb appropriately indicating the image processing to be performed and the parameter to be used in the overlapping area.

The image processing to be performed in the overlapping area is considered to be processing that is either the edge enhancement process or the smoothing process to be performed at a higher level. In this embodiment, by giving consideration to this issue, one of the edge enhancement process and the smoothing process defined by a larger parameter in the output image data OD before the adjustment is determined to be the image processing to be performed (S410 to S430 in FIG. 9). In this way, the image processing to be performed in the overlapping area is determined appropriately.

The edge enhancement process and the smoothing process are types of processing opposing to each other. Thus, it is believed that one image processing to be performed in an overlapping area should be performed at a level reduced as a result of not performing the other image processing. In this embodiment, by giving consideration to this issue, a difference value between the enhancement parameter P1 and the smoothing parameter P2 is determined to be a parameter for one image processing to be performed (S430 and S415 in FIG. 9). This makes it possible to determine a parameter appropriately for the image processing to be performed in the overlapping area.

C. Modifications (1) In each of the above embodiments, the output image data OD includes two area data of the edge enhancement area data AD1 and the smoothing area data AD2. Alternatively, for example, the output image data OD may be one area data indicating the edge enhancement area EA and the smoothing area SA. In this case, in one area data, an area formed by pixels having positive values (parameter) may indicate the edge enhancement area EA, and an area formed by pixels having negative values may indicate the smoothing area SA.

(2) In each of the above embodiments, the edge enhancement area data AD1 indicates the edge enhancement area EA as well as the enhancement parameter P1. Alternatively, the edge enhancement area data AD1 may be data that indicates the edge enhancement area EA and does not indicate the enhancement parameter P1, that is, for example, binary data. The same goes for the smoothing area data AD2.

(3) In each of the above embodiments, the output image data OD is data indicating the edge enhancement area EA and the smoothing area SA. Alternatively or additionally, the output image data OD may indicate an area in which it is preferable to perform other image processing. For example, the output image data OD may include, in addition to the edge enhancement area data AD1 and the smoothing area data AD2, area data indicating an area in which it is preferable to perform a correction process for increasing the chroma. Further, instead of the edge enhancement area data AD1 and the smoothing area data AD2, the output image data OD may include area data indicating an area in which the correction process for brightening an image should be performed and area data indicating an area in which the correction process for darkening an image should be performed. It can be said that the correction process for brightening an image is image processing for increasing the brightness which is a type of the feature value of an image, and it can be said that the correction process for darkening an image is image processing for decreasing the brightness which is a type of the feature value of an image.

The specific methods of edge enhancement process and smoothing process in each of the above embodiments are examples, and are not limited thereto. For example, the smoothing process may be executed by using an averaging filter that calculates an average value within a particular range around the target pixel as the center, instead of the Gaussian filter.

(4) In each of the above embodiments, the two image processing for which the output image data OD indicate the area in which it is preferable to execute the processing (specifically, the edge enhancement process and the smoothing process) includes the processing of increasing a particular feature value (specifically, the edge amount) and the processing of decreasing the particular feature value. Alternatively, such two image processing may be two processing of changing the feature values that are different from each other. For example, the two image processing may be the edge enhancement process for increasing the edge amount and the processing for increasing the chroma.

(5) In the above embodiment, the two image processing for which the output image data OD indicates the area in which it is preferable to execute the processing (specifically, the edge enhancement process and the smoothing process) are executed by using different equations (see the above-mentioned equations (2) to (5)). Alternatively, the two image processing may be executed by using one equation. For example, in a case where the two image processing includes a correction process for brightening an image and a correction process for darkening an image, the two processing may be executed by using one equation that changes the brightness by the amount or the ratio specified by a parameter. In this case, for example, when the parameter is a positive value, the correction process is executed to brighten the image. And, when the parameter is a negative value, the correction process is executed to darken the image.

(6) In each of the above embodiments, two types of machine learning models, that is, the machine learning model for person NA and the machine learning model for landscape NB, are used. Alternatively, three or more types of machine learning models for three or more categories such as a person, a daytime landscape, a night view, and an animal may be used. Alternatively, only one general-purpose machine learning model may be used regardless of the image category. Further, in the printing process in the above embodiment, the identification of the image category is performed by using the machine learning model DN for image identification. Alternatively, the image category may be determined based on a user's input of the category.

(7) In each of the above embodiments, the edge enhancement process and the smoothing process are executed for printing. Alternatively, the edge enhancement process and the smoothing process may be executed for displaying an image on a display, or may be executed for creating an image file to be saved.

(8) The configuration of the machine learning model (generation network GN) of each of the above examples is one example, and is not limited to this. For example, in the generation network GN, the number of layers such as the convolutional layer and the transposed convolutional layer may be changed appropriately. Further, post-processing executed for the values output in each layer may be changed appropriately. For example, as the activation function used for the post-processing, any function such as ReLU, LeakyReLU, PReLU, Softmax, and sigmoid may be used.

Further, processing such as batch normalization and dropout may be added or omitted as the post-processing appropriately.

(9) The specific configuration of the loss function in the training of the machine learning model of the above embodiment may also be changed as appropriate. For example, a cross entropy error, a mean absolute error, or a mean square error may be used to calculate the error value EV.

(10) The hardware configuration of the training apparatus 100 and the image processing apparatus 200 in FIG. 1 is one example, and is not limited thereto. For example, the processor of the training apparatus 100 is not limited to the CPU, but may be a GPU (Graphics Processing Unit), an ASIC (application specific integrated circuit), or a combination of these and a CPU. Further, the training apparatus 100 and the image processing apparatus 200 may be a plurality of computers (for example, so-called cloud servers) capable of communicating with each other through a network. Further, all or part of the printing process executed by the image processing apparatus 200 may be executed by the processor (not shown) of the printer 300.

(11) In each of the above embodiments, a part of the configuration realized by hardware may be replaced with software, and conversely, a part or all of the configuration realized by software may be replaced with hardware. For example, the generation network GN may be realized by a hardware circuit such as an ASIC (Application Specific Integrated Circuit) instead of a program module.

While the disclosure has been described in detail with reference to the above aspects thereof, it would be apparent to those skilled in the art that various changes and modifications may be made therein without departing from the scope of the claims. The disclosure also includes its equivalents.

What is claimed is:

1. A non-transitory computer-readable storage medium storing a set of program instructions for an image processing apparatus, the set of program instructions, when executed by a controller of the image processing apparatus, causing the image processing apparatus to:

acquire input image data indicating an input image; and input the input image data to a trained machine learning model configured to perform calculation processing on the input image data and to generate output image data corresponding to the input image data, the machine learning model being trained to generate the output image data, the machine learning model being trained by:

acquiring training input image data indicating a training input image formed by a plurality of pixels;

acquiring teacher image data corresponding to the training input image data, the teacher image data including first teacher image data and second teacher image data, the first teacher image data representing a first teacher image, the first teacher image being acquired by performing first image processing in a first area of the training input image, the first teacher image having vertical and horizontal sizes same as the training input image, the first teacher image data including a first parameter indicating a level of the first image processing for each of the plurality of pixels, the first parameter of each pixel in the first area being larger than zero, the first parameter of each pixel other than the first area being zero, the second teacher image data representing a second teacher image, the second teacher image being acquired by performing second image processing in a second area of the training input image, the second teacher image having vertical and horizontal sizes same as the training input image, the second teacher image data including a second parameter indicating a level of the second image processing for each of the plurality of pixels, the second parameter of each pixel in the second area being larger than zero, the second parameter of each pixel other than the second area being zero, the first area being an area in which it is preferable to perform the first image processing, the second area being an area in which it is preferable to perform the second image processing different from the first image processing; and adjusting a plurality of parameters of the machine learning model by using a plurality of sets of data pairs each including the training input image data and the teacher image data corresponding to the training input image data.

2. The non-transitory computer-readable storage medium according to claim 1, wherein the output image data includes first area data and second area data, the first area data indicating the first area, the second area data indicating the second area and being different from the first area data.

3. The non-transitory computer-readable storage medium according to claim 2, wherein the machine learning model is configured to generate adjusted area data by using the first area data and the second area data; and wherein the adjusted area data indicates an adjusted first area and an adjusted second area that are adjusted not to overlap each other when the first area indicated by the first area data and the second area indicated by the second area data overlap each other.

4. The non-transitory computer-readable storage medium according to claim 3, wherein the first area data is image data in which each of a plurality of pixel values corresponding to the first area indicates the first parameter of the first image processing;

wherein the second area data is image data in which each of a plurality of pixel values corresponding to the second area indicates the second parameter of the second image processing; and wherein the machine learning model is configured to:
determine image processing to be performed and a parameter to be used, based on the first parameter and the second parameter, for an overlapping area in which the first area indicated by the first area data and the second area indicated by the second area data overlap each other; and generate the adjusted area data indicating the image processing to be performed and the parameter to be used.

5. The non-transitory computer-readable storage medium according to claim 1, wherein the first image processing is processing of increasing a particular feature value of the input image; and wherein the second image processing is processing of decreasing the particular feature value of the input image.

6. The non-transitory computer-readable storage medium according to claim 5, wherein the first image processing is an edge enhancement process of increasing an edge amount of the input image; and wherein the second image processing is a smoothing process of decreasing the edge amount of the input image.

7. The non-transitory computer-readable storage medium according to claim 1, wherein the machine learning model includes:

a first machine learning model trained by using a plurality of sets of first-type data pairs; and a second machine learning model trained by using a plurality of sets of second-type data pairs;

wherein each of the plurality of sets of first-type data pairs includes:

first-type input image data indicating a first-type object; and first-type teacher image data that is the output image data to be output when the first-type input image data is input to the first machine learning model; and wherein each of the plurality of sets of second-type data pairs includes:

second-type input image data indicating a second-type object; and second-type teacher image data that is the output image data to be output when the second-type input image data is input to the second machine learning model.

8. The non-transitory computer-readable storage medium according to claim 2, wherein the first image processing is an edge enhancement process of increasing an edge amount of the input image;

wherein the second image processing is a smoothing process of decreasing the edge amount of the input image;

wherein the first area data is image data in which each of a plurality of pixel values corresponding to the first area indicates a level of the edge enhancement process; and wherein the second area data is image data in which each of a plurality of pixel values corresponding to the second area indicates a level of the smoothing process.

9. An image processing apparatus comprising:
a controller; and
a memory storing instructions, the instructions, when executed by the controller, causing the image processing apparatus to:

acquire input image data indicating an input image;
input the input image data to a trained machine learning model configured to perform calculation processing on the input image data and to generate output image data corresponding to the input image data, the machine learning model being trained to generate the output image data, the machine learning model being trained by:

acquiring training input image data indicating a training input image formed by a plurality of pixels;

acquiring teacher image data corresponding to the training input image data, the teacher image data including first teacher image data and second teacher image data, the first teacher image data representing a first teacher image, the first teacher image being acquired by performing first image processing in a first area of the training input image, the first teacher image having vertical and horizontal sizes same as the training input image, the first teacher image data including a first parameter indicating a level of the first image processing for each of the plurality of pixels, the first parameter of each pixel in the first area being larger than zero, the first parameter of each pixel other than the first area being zero, the second teacher image data representing a second teacher image, the second teacher image being acquired by performing second image processing in a second area of the training input image, the second teacher image having vertical and horizontal sizes same as the training input image, the second teacher image data including a second parameter indicating a level of the second image processing for each of the plurality of pixels, the second parameter of each pixel in the second area being larger than zero, the second parameter of each pixel other than the second area being zero, the first area being an area in which it is preferable to perform the first image processing, the second area being an area in which it is preferable to perform the second image processing different from the first image processing; and adjusting a plurality of parameters of the machine learning model by using a plurality of sets of data pairs each including the training input image data and the teacher image data corresponding to the training input image data;

perform the first image processing on first data out of the input image data, the first data indicating the first area identified by the output image data; and perform the second image processing on second data out of the input image data, the second data indicating the second area identified by the output image data.

10. The image processing apparatus according to claim 9, wherein the first image processing is an edge enhancement process of increasing an edge amount of the input image;

wherein the second image processing is a smoothing process of decreasing an edge amount of the input image; and wherein the instructions, when executed by the controller, cause the image processing apparatus to:

after performing the smoothing process on the second data indicating the second area, perform the edge enhancement process on the first data indicating the first area.

11. The image processing apparatus according to claim 9, wherein the output image data includes first area data and second area data, the first area data indicating the first area, the second area data indicating the second area and being different from the first area data.

12. The image processing apparatus according to claim 11, wherein the machine learning model is configured to generate adjusted area data by using the first area data and the second area data; and wherein the adjusted area data indicates an adjusted first area and an adjusted second area that are adjusted not to overlap each other when the first area indicated by the first area data and the second area indicated by the second area data overlap each other.

13. The image processing apparatus according to claim 12, wherein the first area data is image data in which each of a plurality of pixel values corresponding to the first area indicates the first parameter of the first image processing;

wherein the second area data is image data in which each of a plurality of pixel values corresponding to the second area indicates the second parameter of the second image processing; and wherein the machine learning model is configured to:

determine image processing to be performed and a parameter to be used, based on the first parameter and the second parameter, for an overlapping area in which the first area indicated by the first area data and the second area indicated by the second area data overlap each other; and generate the adjusted area data indicating the image processing to be performed and the parameter to be used.

14. The image processing apparatus according to claim 9, wherein the first image processing is processing of increasing a particular feature value of the input image; and wherein the second image processing is processing of decreasing the particular feature value of the input image.

15. The image processing apparatus according to claim 9, wherein the machine learning model includes:

a first machine learning model trained by using a plurality of sets of first-type data pairs; and a second machine learning model trained by using a plurality of sets of second-type data pairs;

wherein each of the plurality of sets of first-type data pairs includes:

first-type input image data indicating a first-type object; and first-type teacher image data that is the output image data to be output when the first-type input image data is input to the first machine learning model; and wherein each of the plurality of sets of second-type data pairs includes:

second-type input image data indicating a second-type object; and second-type teacher image data that is the output image data to be output when the second-type input image data is input to the second machine learning model.

16. A training method of a machine learning model configured to perform calculation processing on input image data indicating an input image and to generate output image data corresponding to the input image data, the method comprising:

acquiring training input image data indicating a training input image formed by a plurality of pixels;

acquiring teacher image data corresponding to the training input image data, the teacher image data including first teacher image data and second teacher image data, the first teacher image data representing a first teacher image, the first teacher image being acquired by performing first image processing in a first area of the training input image, the first teacher image having vertical and horizontal sizes same as the training input image, the first teacher image data including a first parameter indicating a level of the first image processing for each of the plurality of pixels, the first parameter of each pixel in the first area being larger than zero, the first parameter of each pixel other than the first area being zero, the second teacher image data representing a second teacher image, the second teacher image being acquired by performing second image processing in a second area of the training input image, the second teacher image having vertical and horizontal sizes same as the training input image, the second teacher image data including a second parameter indicating a level of the second image processing for each of the plurality of pixels, the second parameter of each pixel in the second area being larger than zero, the second parameter of each pixel other than the second area being zero, the first area being an area in which it is preferable to perform the first image processing, the second area being an area in which it is preferable to perform the second image processing different from the first image processing; and adjusting a plurality of parameters of the machine learning model by using a plurality of sets of data pairs each including the training input image data and the teacher image data corresponding to the training input image data.

17. The non-transitory computer-readable storage medium according to claim 1, wherein the machine learning model is configured to:

(a) select a target pixel from among a plurality of pixels in the first area of the output image data;
(b) determine whether the target pixel is an overlapping pixel located in an overlapping area in which the first area and the second area overlap each other;
(c) in response to determining that the target pixel is the overlapping pixel, determine whether the second parameter for the target pixel is larger than or equal to the first parameter for the target pixel;
(d) in response to determining that the second parameter for the target pixel is larger than or equal to the first parameter for the target pixel, change the second parameter for the target pixel into a difference value between the second parameter for the target pixel and the first parameter for the target pixel, and change the first parameter for the target pixel into zero;
(e) in response to determining that the second parameter for the target pixel is smaller than the first parameter for the target pixel, change the second parameter for the target pixel into zero, and change the first parameter for the target pixel into a difference value between the first parameter for the target pixel and the second parameter for the target pixel; and
repeat (a) to (e) for all of the plurality of pixels in the first area of the output image data.

18. The image processing apparatus according to claim 9, wherein the machine learning model is configured to:
(a) select a target pixel from among a plurality of pixels in the first area of the output image data;
(b) determine whether the target pixel is an overlapping pixel located in an overlapping area in which the first area and the second area overlap each other;
(c) in response to determining that the target pixel is the overlapping pixel, determine whether the second parameter for the target pixel is larger than or equal to the first parameter for the target pixel;
(d) in response to determining that the second parameter for the target pixel is larger than or equal to the first parameter for the target pixel, change the second parameter for the target pixel into a difference value between the second parameter for the target pixel and the first parameter for the target pixel, and change the first parameter for the target pixel into zero;
(e) in response to determining that the second parameter for the target pixel is smaller than the first parameter for the target pixel, change the second parameter for the target pixel into zero, and change the first parameter for the target pixel into a difference value between the first parameter for the target pixel and the second parameter for the target pixel; and repeat (a) to (e) for all of the plurality of pixels in the first area of the output image data.

19. The training method according to claim 16, wherein the machine learning model is configured to:
(a) select a target pixel from among a plurality of pixels in the first area of the output image data;
(b) determine whether the target pixel is an overlapping pixel located in an overlapping area in which the first area and the second area overlap each other;
(c) in response to determining that the target pixel is the overlapping pixel, determine whether the second parameter for the target pixel is larger than or equal to the first parameter for the target pixel;
(d) in response to determining that the second parameter for the target pixel is larger than or equal to the first parameter for the target pixel, change the second parameter for the target pixel into a difference value between the second parameter for the target pixel and the first parameter for the target pixel, and change the first parameter for the target pixel into zero;
(e) in response to determining that the second parameter for the target pixel is smaller than the first parameter for the target pixel, change the second parameter for the target pixel into zero, and change the first parameter for the target pixel into a difference value between the first parameter for the target pixel and the second parameter for the target pixel; and
repeat (a) to (e) for all of the plurality of pixels in the first area of the output image data.

20. The training method according to claim 16, wherein the first teacher image is acquired by an operator performing the first image processing on the training input image by using photo retouching software;
wherein an area where the first image processing is performed by the operator is shown as the first area and the level of the first image processing performed in the first area by the operator is indicated as the first parameter;
wherein the second teacher image is acquired by the operator performing the second image processing on the training input image by using the photo retouching software; and
wherein an area where the second image processing is performed by the operator is shown as the second area and the level of the second image processing performed in the second area by the operator is indicated as the second parameter.

* * * * *